(12) United States Patent
Kiraly et al.

(10) Patent No.: US 10,596,441 B2
(45) Date of Patent: Mar. 24, 2020

(54) GOLF BALL TRACKING SYSTEM

(71) Applicant: WAWGD, Inc., San Diego, CA (US)

(72) Inventors: Chris Kiraly, San Diego, CA (US); Paulo Merloti, San Diego, CA (US)

(73) Assignee: WAWGD, INC, San Diego, CA (US)

( * ) Notice: Subject to any disclaimer, the term of this patent is extended or adjusted under 35 U.S.C. 154(b) by 0 days.

(21) Appl. No.: 16/236,764

(22) Filed: Dec. 31, 2018

(65) Prior Publication Data

US 2019/0224552 A1 Jul. 25, 2019

Related U.S. Application Data

(60) Provisional application No. 62/620,479, filed on Jan. 23, 2018.

(51) Int. Cl.
| | |
|---|---|
| *A63B 57/00* | (2015.01) |
| *A63B 69/36* | (2006.01) |
| *A63B 71/06* | (2006.01) |
| *A63B 24/00* | (2006.01) |
| *G06T 7/246* | (2017.01) |

(Continued)

(52) U.S. Cl.
CPC ...... *A63B 69/3658* (2013.01); *A63B 24/0021* (2013.01); *A63B 71/0622* (2013.01); *G06T 7/246* (2017.01); *G06T 7/254* (2017.01); *A63B 2024/0034* (2013.01); *A63B 2102/32* (2015.10); *A63B 2220/05* (2013.01); *A63B 2220/62* (2013.01); *A63B 2220/70* (2013.01); *A63B 2220/805* (2013.01); *A63B 2220/807* (2013.01); *A63B 2225/50* (2013.01); *G06T 2207/10016* (2013.01); *G06T 2207/30224* (2013.01); *G06T 2207/30241* (2013.01)

(58) Field of Classification Search
USPC ............... 473/131, 140, 151, 198, 199, 200, 473/219–221, 409
See application file for complete search history.

(56) References Cited

U.S. PATENT DOCUMENTS 4,192,510 A * 3/1980 Miller .................... A63B 69/36
473/157
5,798,519 A * 8/1998 Vock ................... A63B 24/0003
244/3.1

(Continued)

OTHER PUBLICATIONS

International Search Report for PCT/US2018/068106 dated Mar. 15, 2019.

*Primary Examiner* — Nini F Legesse
(74) *Attorney, Agent, or Firm* — Manuel de la Cerra

(57) ABSTRACT

A ball tracking system is disclosed which includes a display, sensors, a launch monitor and a processor that receives data from the sensors and from the launch monitors and outputs a rendering to the display. Specifically, the sensors are positioned to detect a plurality of observed ball flight paths, each in the plurality originating from a different ball strike at a different location. The sensors' field of view is correlated to three-dimensional space. The launch monitor is positioned to detect one of the ball strikes and to measure the launch parameters of that ball strike. The processor performs several processing steps to match the ball strike detected by the launch monitor to the ball flight paths observed by the sensors, and creates a rendering using both the predicted and the observed data.

27 Claims, 13 Drawing Sheets

(51) Int. Cl.
  *G06T 7/254*    (2017.01)
  *A63B 102/32*   (2015.01)

(56) References Cited

U.S. PATENT DOCUMENTS

| | | | |
|---|---|---|---|
| 6,093,923 A * | 7/2000 | Vock | A63B 24/0003 |
| | | | 250/206.1 |
| 6,179,720 B1 * | 1/2001 | Rankin | A63B 24/0021 |
| | | | 473/154 |
| 8,641,548 B2 * | 2/2014 | Rauchholz | A63B 67/02 |
| | | | 473/238 |
| 9,737,757 B1 | 8/2017 | Kiraly | |
| 2007/0167247 A1 * | 7/2007 | Lindsay | A63B 24/0021 |
| | | | 473/131 |
| 2009/0036237 A1 * | 2/2009 | Nipper | A63B 24/0021 |
| | | | 473/409 |
| 2010/0104136 A1 | 4/2010 | Kiraly | |
| 2013/0184095 A1 * | 7/2013 | Rauchholz | A63B 69/36 |
| | | | 473/223 |
| 2014/0003666 A1 | 1/2014 | Park | |
| 2015/0103168 A1 | 4/2015 | Marty et al. | |
| 2015/0343291 A1 | 12/2015 | Leech | |
| 2016/0193501 A1 | 7/2016 | Nipper et al. | |
| 2017/0246543 A1 | 8/2017 | Dawe et al. | |

\* cited by examiner (Method 100)

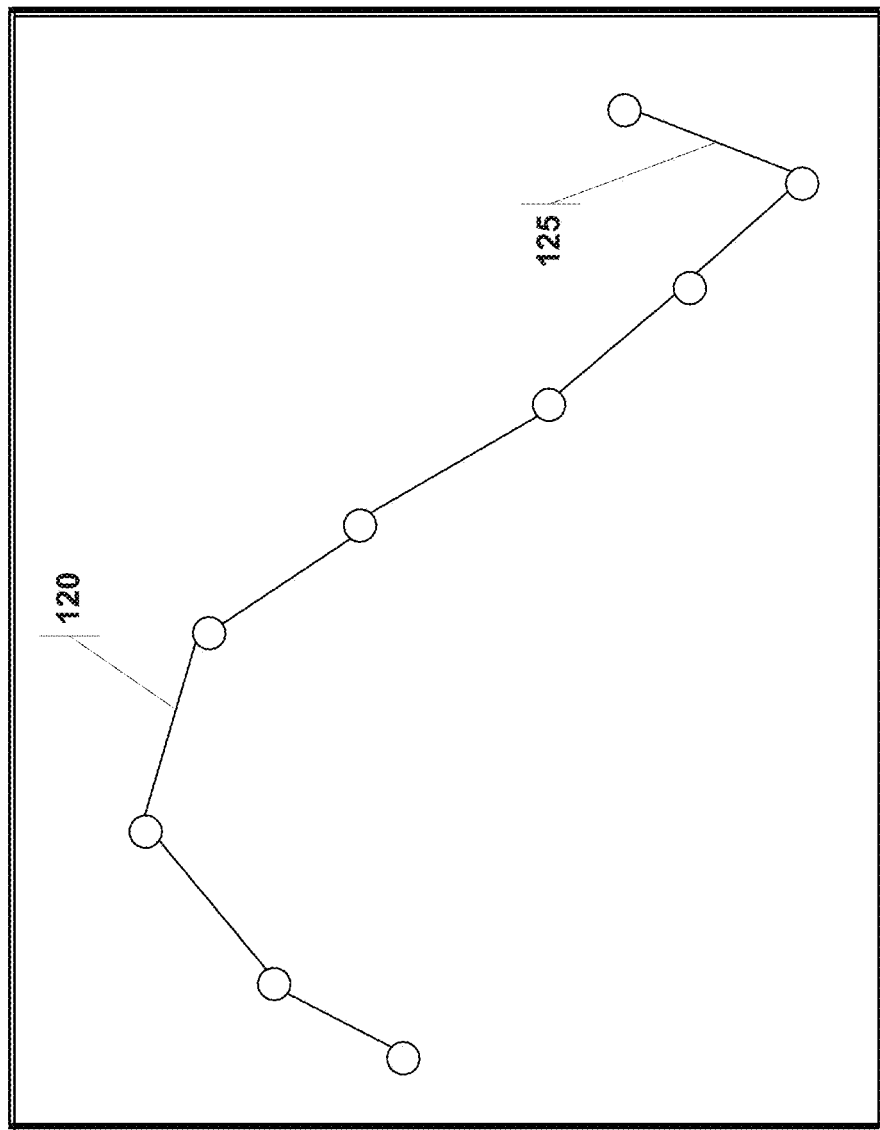

(Side View)

(Side View)

(Top View)

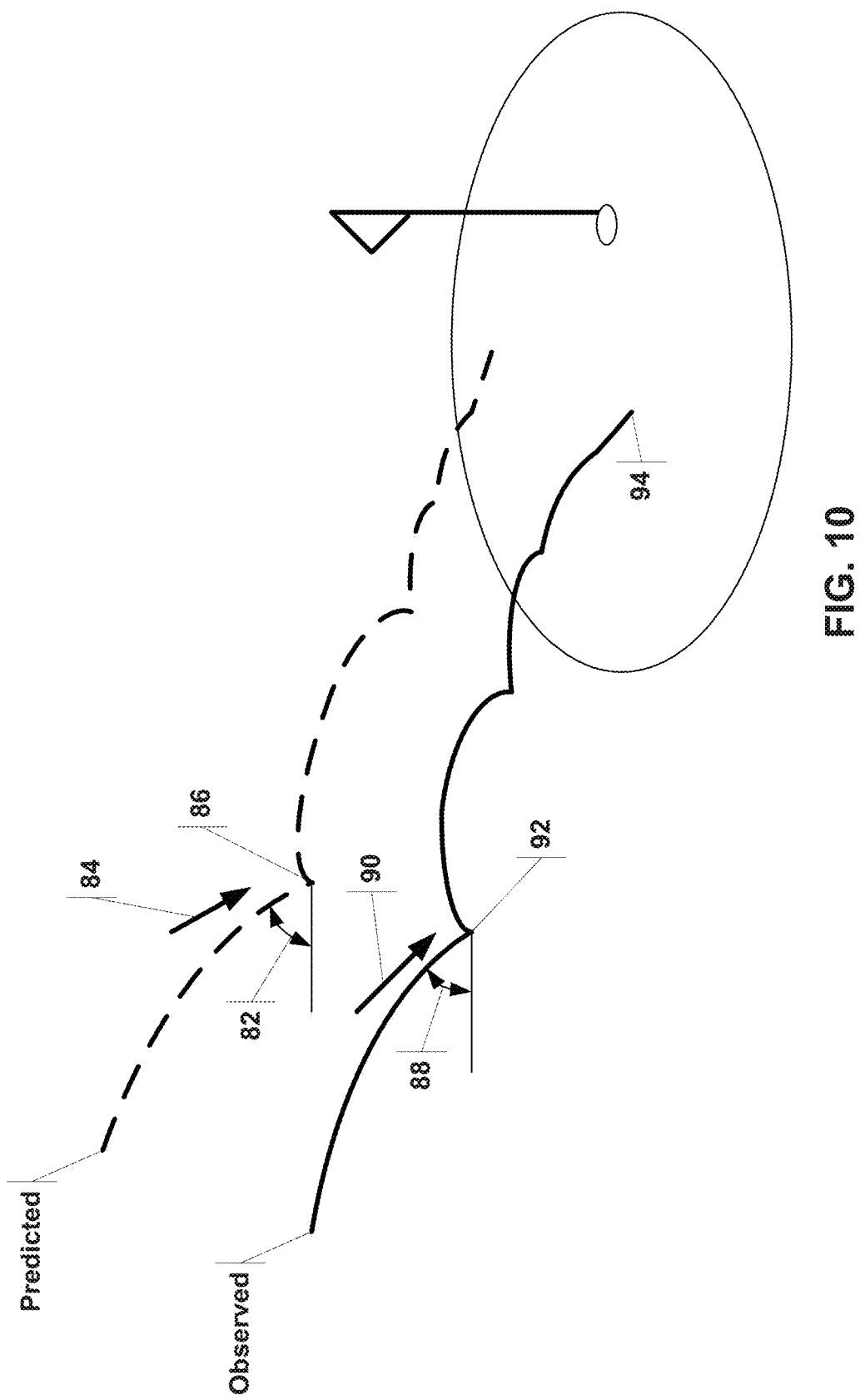

(Method 200)

GOLF BALL TRACKING SYSTEM

1.0 RELATED APPLICATION

This application claims priority to provisional patent application Ser. No. 62/620,479 entitled "Golf Ball Tracking System" filed on Jan. 23, 2018, the entire contents of which are incorporated herein by reference.

2.0 TECHNICAL FIELD

This invention relates to a golf ball measurement systems. More particularly, the invention relates to a method and system to accurately measure and track the trajectory of a golf ball.

3.0 BACKGROUND

A golf ball launch monitor is an electronic device for assisting a golfer in improving his or her game. More particularly, the monitor is used to analyze the initial path of the golf ball after it is struck by a golf club, and to present to the golfer the likely flight path information for the ball. Typically, the flight path information will include ball speed, ball direction, spin, and a projected flight path or distance. The launch monitor typically has an imager piece which couples to a processor and to a display. The imager piece is placed close to where the golfer is expected to hit the ball, with the imager's sensor directed toward the ball or tee.

Usually, the launch monitor is pre-aligned to a target line, with an optional step to change the target line. The monitor, based on the initial flight parameters and its current alignment, calculates the flight characteristics of the golf ball, including the ultimate position of the ball. Such a monitor is described in various previous patent applications by the inventor of the present invention, including U.S. Pat. No. 7,324,663 entitled "Flight Parameter Measurement System" and issued on Jan. 29, 2009, U.S. Pat. No. 7,292,711 entitled "Flight Parameter Measurement System" and issued on Nov. 6, 2007, U.S. Pat. No. 7,641,565 entitled "Method and Apparatus For Detecting The Placement of a Golf Ball for a Launch Monitor" and issued on Jan. 5, 2010, U.S. Pat. No. 7,497,780 entitled "Integrated Golf Ball Launch Monitor" and issued on Mar. 3, 2009, U.S. Pat. No. 7,540,500 entitled "Foldable Launch Monitor For Golf" and issued on Jun. 2, 2009, and U.S. Pat. No. 8,951,138 entitled "Golf Club Head Measurement System" and issued on Feb. 10, 2015; the contents of all these patents are incorporated herein by reference in their entireties.

However, a launch monitor can only predict the trajectory of a golf ball and not its actual trajectory. What is needed, therefore, is a system and method that tracks the actual trajectory and position of multiple golf balls.

4.0 SUMMARY

This patent describes a method for accurately locating where golf balls land, roll, and stop after being struck by a golfer in a multi-bay driving range. There are no requirements for specially marked balls, either with passive methods like markings on the ball, or active methods, like embedding radio frequency emitting devices inside the ball. The major challenge, then, is how to map golf balls located down range to its originating bay. This patent describes a method to map the driving bay golf shots to the down range ball detection using a prediction algorithm that integrates information from several sub-systems, as detailed described henceforth. In addition, the mapping algorithm is also used to command visual effects down-range when a golfer successfully hits a target.

The preferred embodiment of this invention can be used in target-based games for multi-level, multi-bay golf driving ranges, where virtual targets depicted in a computer simulation software are mapped to real targets down-range, and golf ball hits are represented in the simulator in semi-real time. If golf balls land, roll or stop within a certain target boundary, points can be attributed to the golfer that played the ball.

Specifically, a ball tracking system is disclosed that includes a display, sensors, a launch monitor and a processor that receives data from the sensors and from the launch monitor and outputs a rendering to the display. Specifically, the down range sensors are positioned to detect a plurality of observed ball flight paths, each in the plurality originating from a different ball strike at a different location. The sensors are correlated to three-dimensional space. The launch monitor is positioned to detect one of the ball strikes and to measure the launch parameters of that ball strike. The processor performs the following steps: (a) receive the launch parameters from the launch monitor; (b) calculate a predicted ball flight path based on the launch parameters; (c) receive image data from the sensor; (d) identify an observed ball flight path and a landing event for each of the plurality of observed ball flights paths; (e) determine the landing location for each identified landing event; (f) based on the predicted ball flight path, determine a multidimensional matching distance for each of the plurality of landing locations; (g) select the matching multidimensional distance (as described later in this document, the distance need not be simply a Euclidean distance, but may also include other parameters like predicted landing time, descent angle, etc.) that is closest to the predicted ball flight path; (h) morph the predicted ball flight path with the observed ball flight path and landing location associated with the closest distance; and (i) communicate to the display a video rendering based on the morphed ball flight path. The system may include various refinements to increase the matching accuracy.

Additional aspects, alternatives and variations, as would be apparent to persons of skill in the art, are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

5.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. Furthermore, various features of different disclosed embodiments can be combined to form additional embodiments, which are part of this disclosure. It will be understood that certain components and details may not appear in the figures to assist in more clearly describing the invention.

FIG. 8B illustrates the target processor image processing.

FIG. 10 illustrates the ball flight parameters for both the predicted and observed ball landings.

6.0 DETAILED DESCRIPTION

Figure 1:
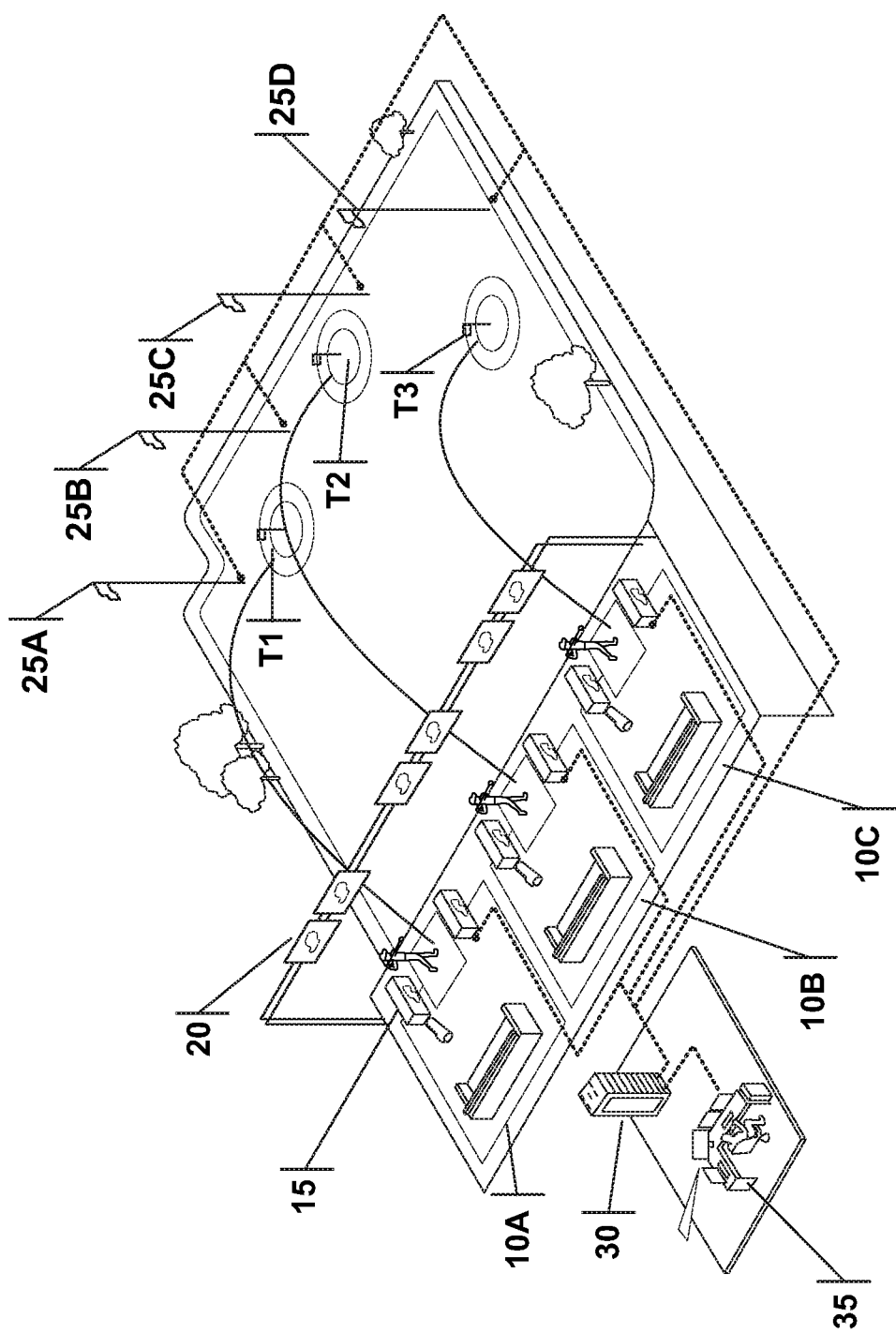
FIG. 1 illustrates a stylized view of the golf ball hitting facility with multiple driving bays.

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with FIGS. 1-12 and is provided for ease of reference, where like reference numerals designate corresponding features throughout the specification and figures:

| Feature | Reference |
|---|---|
| Golf Ball Hitting Facility | 5 |
| Golf Ball Driving Bays | 10A, 10B, 10C, 10D, 10E |
| Launch Monitor | 15 |
| Overhead Launch Monitor | 15A |
| Simulators | 18 |
| Display | 20 |
| Golf Ball Tracing System | 22 |
| Down Range Sensors | 25, 25A, 25B, 25C, 25D |
| Side-positioned Down Range Sensor | 25E |
| Atmospheric Sensor(s) | 25F |
| Targets | T1, T2, T3 |
| Central Processor | 30 |
| Fusion Processor | 32 |
| Target Processor | 34 |
| Facility Control Panel/Processor | 35 |
| GPS Receiver/Optical Fiducial Complex | 36 |
| Golf Ball and Tee | 37 |
| Portable Player Operated Device | 39 |
| Down Range Sensors Field of View | 40A, 40B, 40C, 40D |
| Ball Strike Trajectories | 45A, 45B, 45C, 45D, 45E |
| Data From Down Range Sensor to Central Processor | 50 |
| Data From Launch Monitor to Central Processor | 55A, 55B |
| Data From Central Processor to Launch Monitor/Display | 55AA, 55BB |
| Ball Speed | 60 |
| Launch Angle | 65 |
| Ball Spin Speed | 70 |
| Ball Spin Angle | 75 |
| Launch Azimuth | 80 |
| Descent Angle (Predicted) | 82 |
| Impact Speed (Predicted) | 84 |
| Landing Position (Predicted) | 86 |
| Descent Angle (Observed) | 88 |
| Impact Speed (Observed) | 90 |
| Landing Position (Observed) | 92 |
| Ball Rest Position Observed | 94 |
| Method For Matching the Predicted Flight Path to the Observed Flight Path | 100 |
| Steps in Method For Matching the Predicted Flight Path to the Observed Flight Path | 105-175 |
| Method for Ranking and Matching Possible Observed and Predicted Ball Data Pairs | 200 |
| Steps in Method for Ranking and Matching Possible Observed and Predicted Ball Data Pairs | 205-245 |

Figure 2:
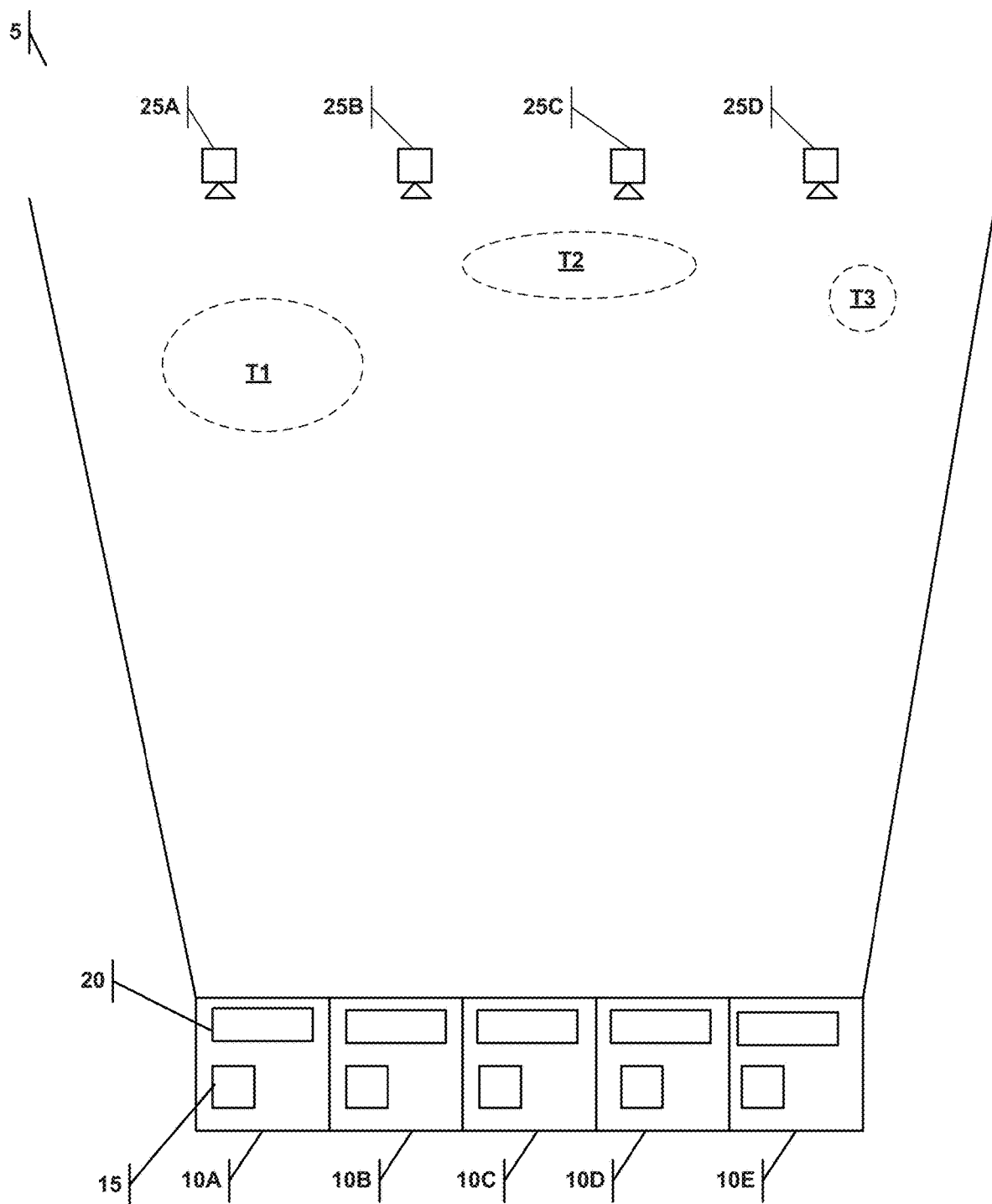
FIG. 2 is a plan view of a golf ball hitting facility with multiple driving bays.

FIG. 1 is a stylized view of a gold ball hitting facility with three bays. FIG. 2 illustrates a golf ball hitting facility 5 with five golf ball hitting bays (10A, 10B, 10C, 10D, 10E). The facility 5 also has four down range sensors (25A, 25B, 25C, 25D). More details of the mounting of the down range sensors may be found in the "DTS Target Requirements" document filed as part of the provisional application 62/620, 479 and incorporated herein by reference. Also submitted as part of the provisional application 62/620,479 is a document entitled "Downrange System: Vision and High Level Requirements", the contents of which are incorporated herein. Of course, the system described herein may have a different number of bays or down range sensors.

The facility may be entertainment oriented with the player attempting to hit the ball into various targets (T1, T2, T3) and earning points when doing do. Players may compete against other players in different driving bays, or with other players in their own driving bays. More details of the facility 5 may be found in the "Commercial & Entertainment Range Solutions" document, filed as part of the provisional application 62/620,479 and incorporated herein by reference.

Each driving bay may include a launch monitor 15 and a display 20. The launch monitor 15 measures the initial launch conditions of the ball strike, while the monitor can display information regarding the ball strike, such as speed, distance, trajectory, and position. If the player is in a competition mode, it may also display a score along with the scores of other players, or other information regarding the current game. It would be apparent that the display 20 could also be used to promote other commercial activities, such as food, beverages, and apparel.

Figure 3:
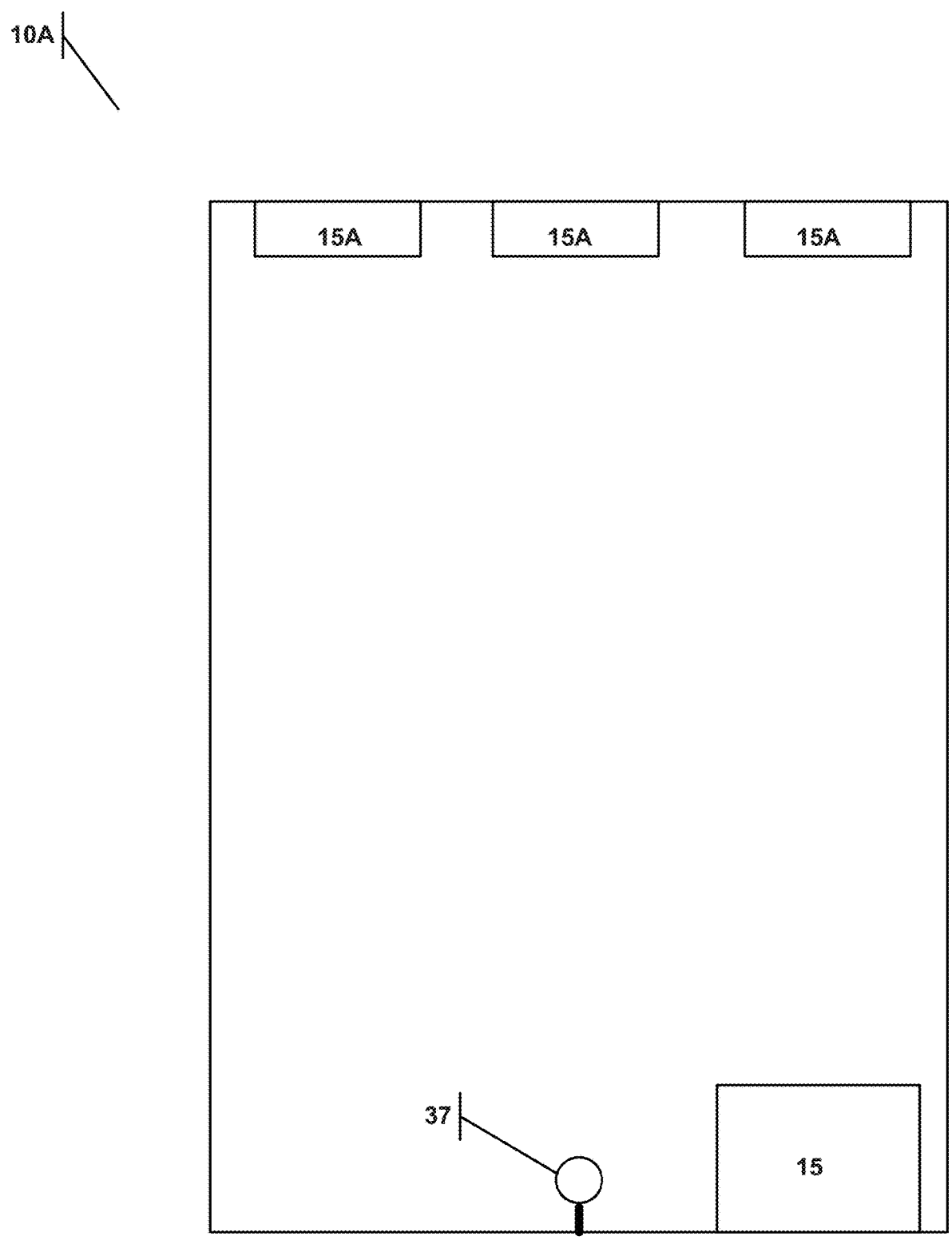
FIG. 3 is a view of a driving bay looking down range, illustrating the various positions of the launch monitor.

FIG. 3 is a front view of a driving bay 10A looking through the bay and down range. This illustrates that the launch monitor 15 may be placed on the floor. This placement has the limitation of only being able to detect a ball strike from one side of the monitor. So, in FIG. 3, the position of launch monitor 15 would accommodate a right-handed golfer. For a left-handed golfer the monitor would have to be moved to the other side, or an additional monitor would have to be place on the other side. As another alternative overhead monitors 15A may be used in addition to or in lieu of the floor-based monitor. An advantage of the overhead monitor is that it can accommodate both left and right-handed golfers.

Figure 4:
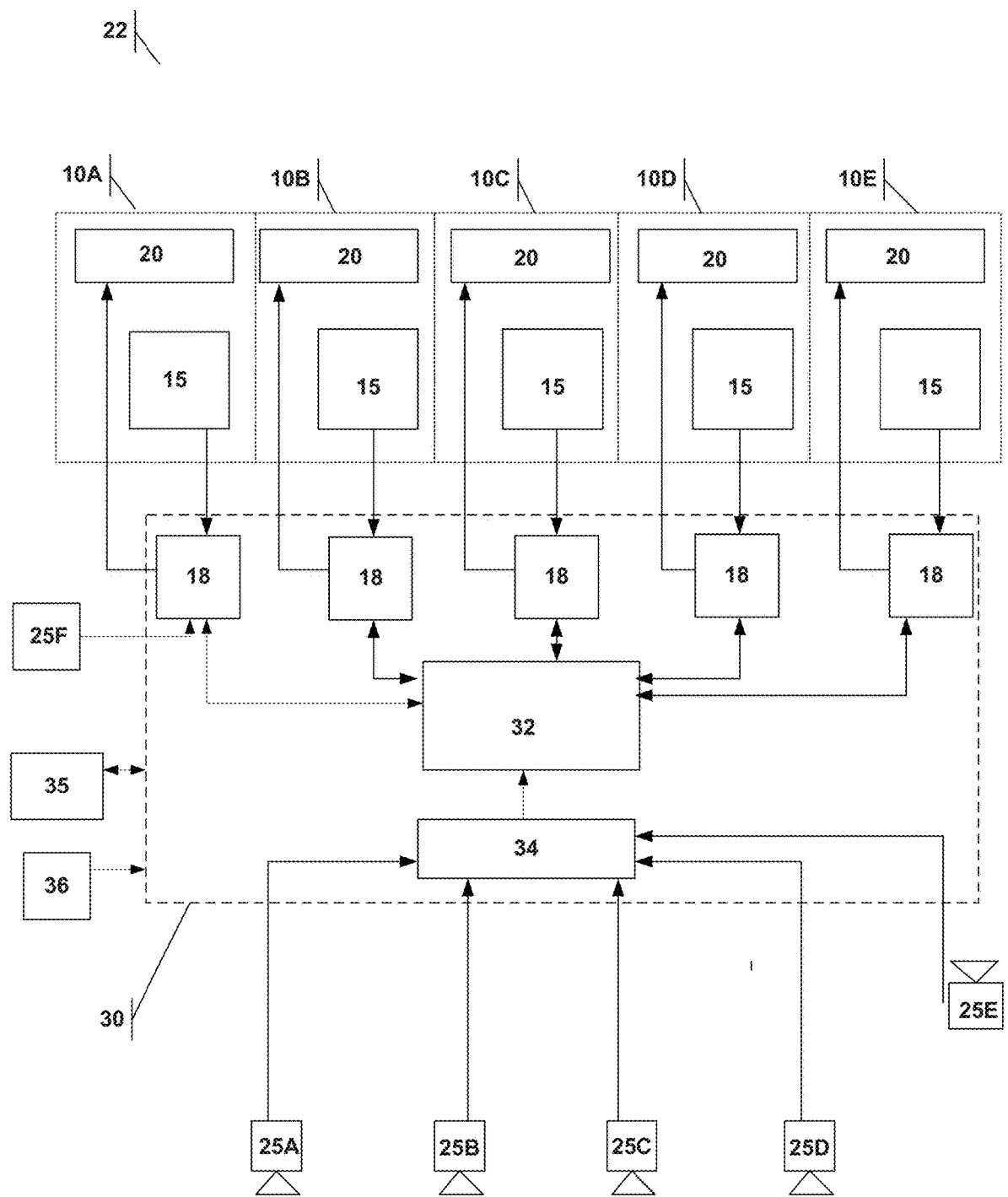
FIG. 4 illustrates the golf ball tracking system, including the connections between a central processor, sensors, displays and launch monitors.

FIG. 4 illustrates the golf ball tracking system 22, including the connections between a central processor, displays and launch monitors in each driving bay, and down range sensors. Specifically, the down range sensors (25A, 25B, 25C, 25D) are connected to a central processor 30. The launch monitors 15 from each driving bay (10A, 10B, 10C, 10D, 10E) are also connected to the central processor 30. These connections can be wireless or wired. The facility may have a control panel/processor 35 that allows the operator of the facility to monitor the gameplay and to provide announcements to the players.

The central processor 30 may include various subcomponents. For example, it may further include launch simulators 18, which may receive launch parameters from the launch monitor 15 and may produce a rendering of flight path that can be displayed on the display 20. While FIG. 4 shows that each launch monitor 15 has its own simulator 18, a single simulator 18 with multiple inputs from each of the launch monitors 15 may instead be used. The simulators 18 exchange data to and from the fusion processor 32. The camera/sensors 25A-E provide(s) data to a target processor 34 that then provides data to the fusion processor 32. While the target processor 34 is shown as a single processor, multiple processors may be used. It should therefore be apparent that the central processor 30 may be more than one processor.

Figure 5:
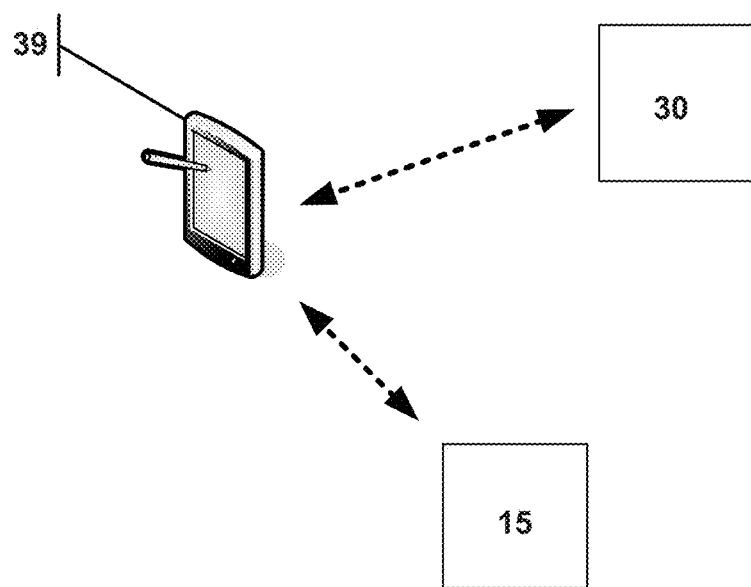
FIG. 5 illustrates control and display function with a customer operated device.

FIG. 5 illustrates a player-controlled device 39 that is in communication with the launch monitor 15 and/or the central processor 30. The device 39 may be the player's own smart phone or tablet, running an appropriate application. The device 39 may be used instead of, or in conjunction with, the display 20 to display relevant data from a ball strike. The device 39 may also be used to order merchandise, food of beverages. The device 39 can also control the monitor 15. As a non-limiting example, the system 22 may direct a first player to strike the ball, and, after registering the trajectory, may direct a second player to strike the ball. A player, however, may have decided to take a mulligan on the first strike and would like to re-strike the ball. To do so, the player must communicate with the launch monitor 15 or central processor 30 that the next hit should be associated with the first player and not the second. This override control may be available on the device 39, as well as other controls.

Figure 6:
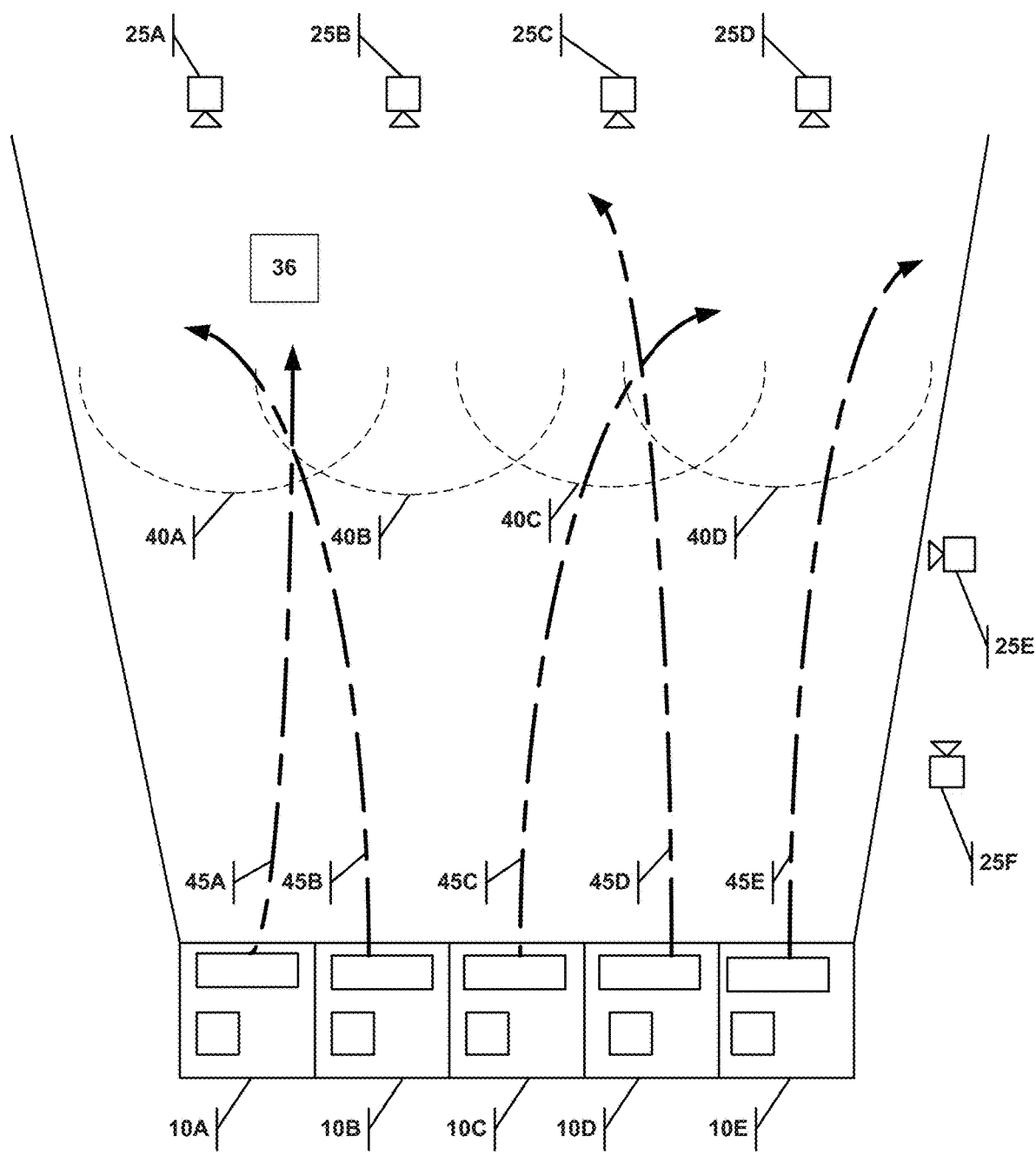
FIG. 6 is a plan view of the golf ball hitting facility, along with the top view of the trajectories of balls hit from the multiple driving bays.

FIG. 6 is a plan view of the golf ball hitting facility, along with the top view of the trajectories of balls hit from the multiple driving bays. Multiple players may simultaneously strike several ball strike trajectories (45A, 45B, 45C, 45D, 45E). The down range sensors have a specific field of view (FOV). For example, down range sensor 25A has a FOV 40A, and sensor 25B has a FOV 40B, and so on. Ball strike 45A enters the FOV of other sensors 25A and 25B and lands within the FOV of both of these sensors as well. However, strike 45B enters the FOV 40B of sensor 25B and then exits it.

The data from these sensors is used in conjunction with the parameters from the launch monitors located at or near the bays to accurately determine the actual trajectory and position of the ball strike. Because the locations of the sensors (25A, 25B, 25C, 25D) and their orientation is known, as are their FOVs (40A, 40B, 40C, 40D), the central processor 30 can analyze the data stream from the sensors, and can determine the actual positions and trajectories of the golf balls relative to the golf ball hitting bays. This association is used in the matching process described below. This location and orientation may be made during the installation of the system. For example, a high accuracy GPS receiver mounted on a structure with an optical fiducial may be used within the FOV of the down range sensors. From the GPS data and the location of the optical fiducial within the down range sensor data stream, a highly accurate position and orientation of the down range sensors can be achieved. This GPS receiver/optical fiducial complex 36 may be left in place at the facility (as shown in FIG. 4), and the position/orientation of the down range sensors can be re-calibrated periodically. Alternatively, the GPS receiver/optical fiducial complex may be mounted to a mobile structure, such as a golf cart, and may be moved throughout the facility so that each down range sensor can detect it within its respective FOV. Once detected, each down range sensor can be re-calibrated.

It should be noted that the down range sensors can be placed at various locations, such as that shown in sensor 25E. Other sensors, such as an atmospheric sensor 25F, can be used to more accurately track the ball strikes. The atmospheric sensor 25F, for example, may measure atmospheric air pressure, humidity, temperature and/or wind speed/direction.

Figure 7:
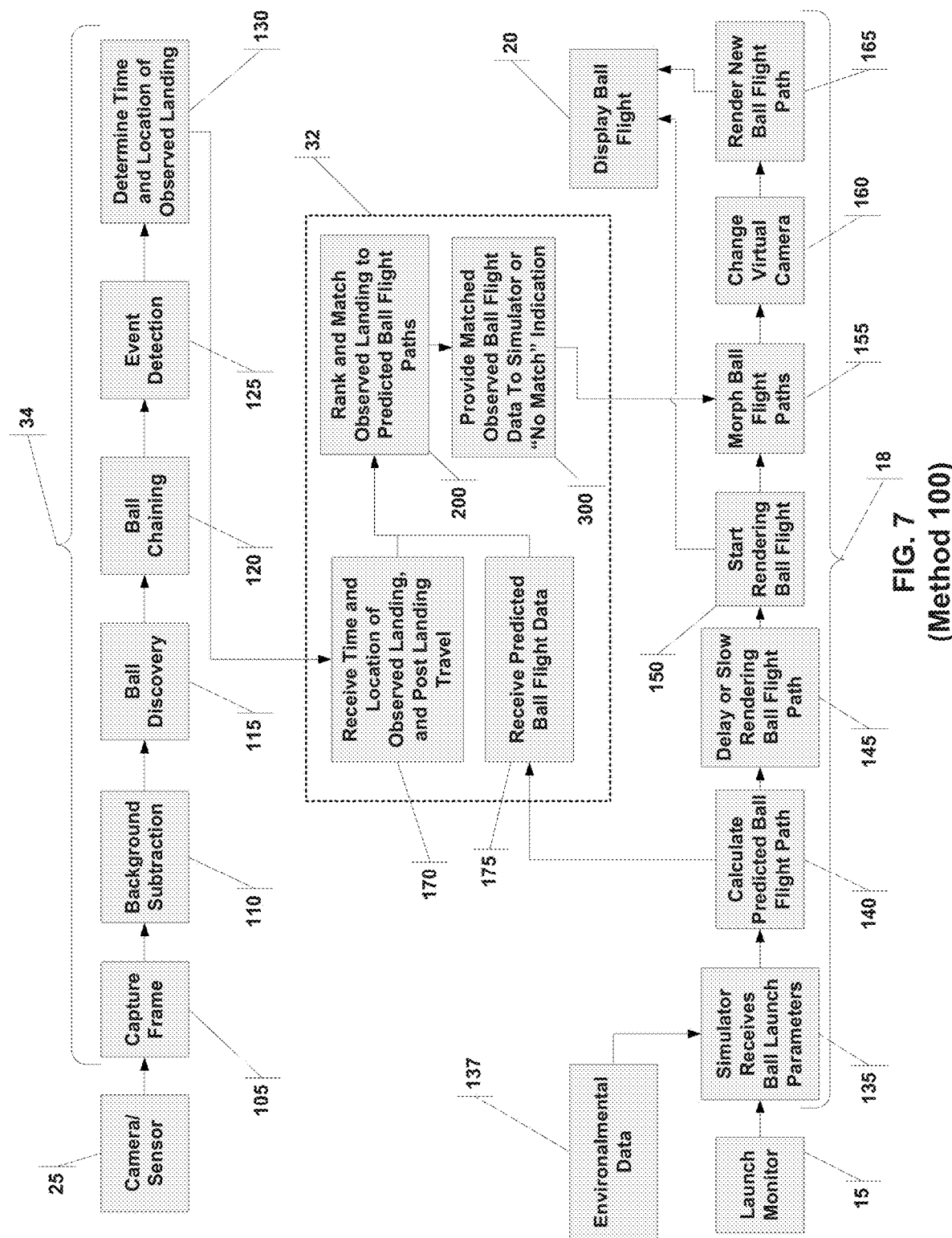
FIG. 7 is a flowchart used in the golf ball tracking system to match the predicted flight path to the observed flight path.

FIG. 7 is a method 100 used to match the predicted flight path to the observed flight path. When a player strikes a golf ball, the launch monitor 15 detects a strike and measures the initial launch parameters, which may include ball speed, launch angle, ball spin speed, ball spin angle, and launch azimuth. These various parameters are shown graphically in FIGS. 9A-9C. These launch parameters are provided to the simulator 18, which performs steps 135-160. After receiving the launch parameters, the simulator 18 calculates a predicted ball flight path (steps 135, 140) that may include a time and position of landing, and may further include the predicted angle of descent and the impact speed, which is provided to the fusion processor 32 (step 175). This is shown graphically in FIG. 10. The simulator 18 may also use environmental data, including air temperature, humidity, wind speed, wind direction, air pressure and terrain 3D model, to refine the predicted ball flight path (step 137).

Because it will take time for the golf ball to come into the field of view of the camera/sensors, and it will take time for the target processor 34 to perform image processing and for the fusion processors 32 to match the data, the simulator 18 cannot fully render the golf flight path with the actual landing position and the final resting place of the golf ball.

So in step 145, the rendering of the ball flight path is delayed or slowed to allow the system 22 time to match the predicted and observed ball flight path. The rendering may begin in step 150, and such a rendering is based on the predicted flight path; this rendering may be displayed as a video where the golf ball is moving through space. Once the fusion processor 32 has made an appropriate match such that the actual landing and final position of this particular golf ball strike is known, then the simulator 18 can correct the simulated flight path rendering with the actual flight path by morphing the two in step 155 and then rendering the new flight path that is sent to the display (step 165). The displayed flight path may further include the final post landing travel of the ball and the ball rest position. It should be noted that the post landing travel is difficult to accurately predict because the interaction with the ground can be variable and imprecise to model. By having the actual observed post landing travel data from the target processor 34, the rendering shown on the display 20 can be highly accurate.

In an entertainment venue, customers may have a less pleasant experience if they must wait for the ball flight path to be displayed, while the system makes a final match between the predicted and actual ball flight paths. To promote better customer experience, the system may display the launch parameters immediately for a few seconds, and then begin to render and display the flight path based on the simulator model. This provides the delay necessary for the system to make the match. However, the simulated ball flight path will differ from the actual flight path, and that difference may be noticeable. The morphing of the predicted to the actual ball flight path therefore, may require a noticeable change to the rendered ball flight path. If a static viewing angle for the rendering in maintained, then the morphing may look disjointed and unnatural (e.g., the flight path requires an impossible mid-air turn to arrive at the actual landing spot).

Step 160 is included to mask this, and provide a more visually-appealing rendering. The first part of the rendering (step 150) may be displayed from one angle, and when the paths are morphed, the angle can be changed (step 160). It is during this change that the actual flight path can be included in the rendering. So, for example, the initial camera angle may be a side view located adjacent to the driving bay. This view may be static and may be maintained during the rendering based on the simulator. Once the morphing begins, the camera angle may sweep from the side view to a perspective view from a vantage point that is at a location that is near the ball landing position. During this change in the virtual camera (step 160), the correction (morphing) is performed such that the customer cannot visually detect the correction on the ball flight path that is displayed. In other words, the system is blending the predicted trajectory with the observed trajectory to form a seamless trajectory that is displayed in a video-like fashion to the customer in near-real time. The change in virtual camera (step 160) need not be a sweep, but may be a two separate camera angles with a discrete transition between them.

If, for whatever reason, the central processor 30 cannot perform a match, the system 22 can display the trajectory to the user based completely on the predicted trajectory. When the system 22 is able to perform the matching, however, the morphed trajectory can again be used and displayed.

Now, the processing performed by the target processor 35 will be discussed. When the system is first installed, the pixels from each of the camera/sensors are mapped to actual locations on the ground, referring to herein as calibration pixel mapping. In other words, the sensor's FOV is correlated to three-dimensional space. This means that if an object detected on a camera/sensor is located at a pixel position that is previously map as a ground location, the system will know the actual position of that object. When the target processor 35 receives image data from the camera/sensor 25, it captures the frames (step 105). The background is subtracted from the frames (step 110), using, by way of a non-limiting example, a Gaussian Mixture Model for background subtraction (MOG) algorithm. Other background subtraction methods may also be used. It should further be noted that the background subtraction algorithm may be fine-tuned to more robustly subtract everything except the movement of a golf ball. For example, if the detected movement is slow (e.g., a groundskeeper walking in the FOV or a bird flying) compared to the expect speed of a golf ball, the algorithm may be tuned to subtract those slower movements as well.

The resulting frames would reveal an object or objects moving through successive frames, and that image may be identified as a ball (step 115). The identification of the object as a ball (blob detection) may be assisted by comparing the position of the object in successive frames to the expected arch trajectory of a golf ball. If the object follows such a trajectory, then it may be a golf ball. The point where the object enters the camera/sensor FOV may also be used to refine the golf ball detection, with objects that enter the FOV at locations that are not consistent with the expected golf ball trajectory being rejected as golf ball candidates. Also, the speed of the object may be used.

Each of the discovered balls in successive frames is then chained, and from the chaining an event can be detected (steps 120, 125). The event may be the landing of the ball and/or the ball coming to rest. Because the pixel locations for the events are known, the actual time-stamped location of events can be determined in step 130 because of the calibration pixel mapping. This information is transferred to the fusion processor in step 170.

Once the fusion processor 32 receives the time and location of the observed landing (step 170) and the predicted ball flight data (step 175), the fusion processor 32 can match the observed landing to the predicted ball flights in step 200. The steps in performing such a match are discussed below with reference to method 200. Once that match is made, the observed flight path is provided to the simulator 18 in step 300 so that the simulator 18 can morph the flight paths (step 155).

Figure 8A:
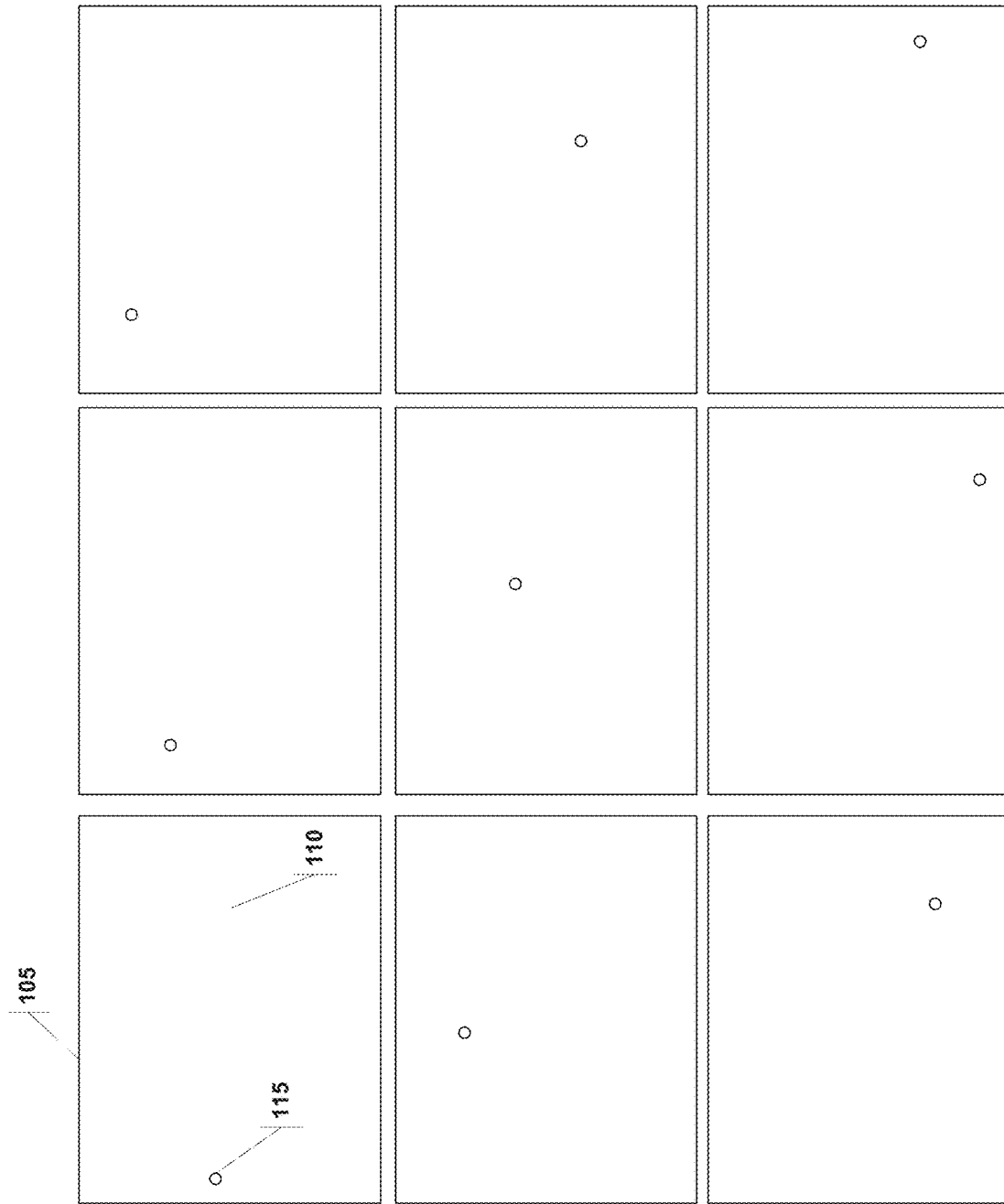
FIG. 8A illustrates the target processor image processing.
Figure 9A:
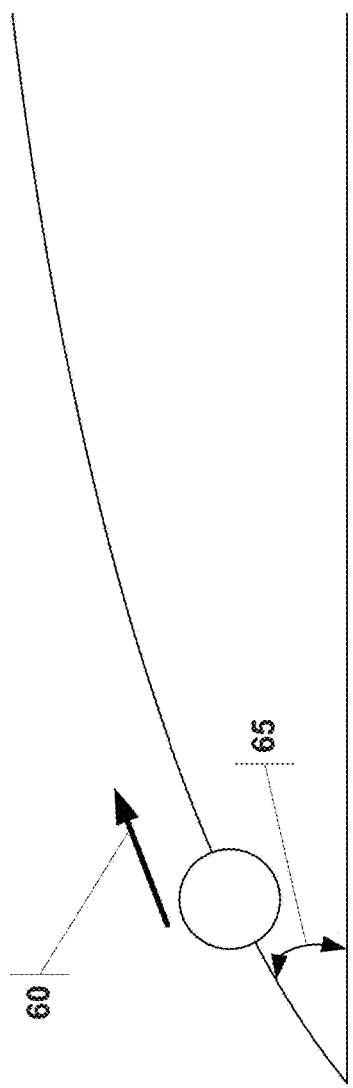
FIG. 9A illustrates the ball launch parameters.
Figure 9C:
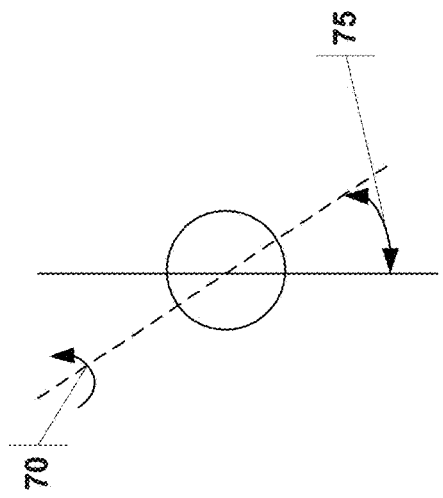
FIG. 9C illustrates the ball launch parameters.
Figure 9B:
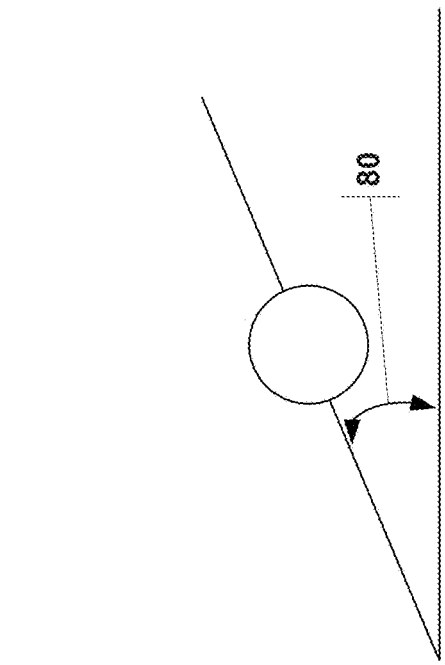
FIG. 9B illustrates the ball launch parameters.

FIGS. 8A and 8B illustrate the frame capture, background subtract, ball discovery, ball chaining and event detection (steps 105-125) performed by the target processor 34. FIG. 8A represents nine successive frames captured (step 105) by the target processor, wherein each frame has had the background subtracted (step 110), resulting in only the object in the image. The object may be identified as a ball by using a number of criteria, including but not limited to: the object speed, location within the FOV, and the position of the object in successive frames. Once the object is identified as a ball (step 115), the identified golf balls can be chained to each other. FIG. 8B illustrates the nine frames of FIG. 8A layered onto one frame, and each of the identified balls are chained together (step 120). The chaining identifies a rough trajectory of the golf ball and helps to determine the spot where the golf ball landed. Looking at the last three ball positions, the chain between the second-to-last and the third-to-last is at a marked different angle and direction than the chain between the second-to-last and the last. This is an event where the ball changed its ball path abruptly because it landed. This detected event (step 125) may then be correlated to a time-stamped actual position of the landing based on the calibration pixel mapping. It should be noted that FIGS. 8A and 8B illustrate much of the ball trajectory in only nine frame captures. In practice, a ball trajectory may be in the camera's FOV for 4 to 6 seconds (even longer) and at a frame rate of 30FPS (or more), this would represent 120 to 180 frames (or more), from which the target processors can extract the necessary information. This increased granularity would allow for a more precise location of the ball landing in pixel space, and therefore a more precise actual landing location, to be detected.

While the example provided above tracks only one ball, the same process may be used to track several balls simultaneously. The chaining for multiple-simultaneous balls may be performed based on the time and/or shape of the trajectory. Balls that enter the FOV at the same time, or close to the same time, will be from different driving bays, so their trajectories will be different. The possibility of multiple golf balls flying within the camera's FOV is evaluated on every frame. For every new frame, multiple candidate balls (already filtered out by MOG and blob detection) can be found. Each candidate ball has its likelihood of belonging to an existing chain evaluated. After such an evaluation, the candidate ball is assigned to the chain that has the greatest likelihood. If the candidate ball does not fit into any existing chain (likelihood index is below a certain threshold), then it starts a new chain. The likelihood of one ball belonging to an existing chain uses a range of possible values on parameters that include ball speed, direction and angle of descent. It follows that by not forcing a candidate ball to be included into a chain, and instead by creating another unity chain, it allows multiple chains (ball trajectories) to be simultaneously tracked.

Now the method 200 for ranking and matching possible observed and predicted ball data pairs implemented in the fusion processor 32 will be detailed. The process of matching the down range sensor data to the launch monitor measure launch parameters is performed by comparing several predicted landing parameters such as impact location, impact velocity vector, angle of incidence and real-time global clock with the observed tracking data as reported by the down range sensors. Because there are several simultaneous ball strikes, the predicted landing parameters are paired with observed data and assigned a probabilistic score to each pairing. The highest scoring pairing that achieves a minimum threshold of probability is selected. If a successful pairing is detected, the observed tracking data from the down range sensors is matched with the data from the driving bay, and that is sent to the originating driving bay.

From the simulator 18, the following data from the predicted ball flight path may be provided to the fusion engine 32 in step 175:

$t_p$ time of landing (predicted)
$s_p$ speed of impact (predicted) (84)
$A_p$ descent angle (predicted) (82)
$(x, y, z)_p$ landing position (predicted) (86)

And from the target processor 34, the following data may be provided to the fusion engine 32 in step 170:

$t_0$ time of landing (observed)
$s_0$ speed of impact (observed) (90)
$A_0$ descent angle (observed) (88)
$(x, y, z)_0$ landing position (observed) (92)

These various parameters as shown graphically in FIG. 10. The fusion processor 32 may then use Eq. 1 to determine a multi-dimensional matching distance:

$$D_1 = \frac{|t_p - t_0|}{\text{timeout}} \times K_t + \sqrt{(x_p - x_0)^2 + (y_p - y_0)^2 + (z_p - z_0)^2} \times K_p \quad \text{Eq. 1}$$

where:
timeout, time window during which observed landings are considered
$K_t$ time calibration constant
$K_p$ position calibration constant The equation has two components, one temporal and one spatial. The temporal component compares the time predicted to the observed landing time. The greater the difference/distance, the larger its influence on the multi-dimensional matching distance D1. Therefore, even if the ball landing is detected in precisely the same location as a predicted landing, if the landing occurs at a time difference/distance that is too great, then it is likely that they are not a match. Likewise, the timeout may be used to further increase processing speed and accuracy, by a priori removing from consideration observed landings that occurred too far in time from the predicted landing. By having this temporal cutoff, the fusion processor 32 need not waste time and storage resources comparing candidates that logically have no chance of matching.

Equation 1 also has a spatial component: the greater the difference/distance in the landing location, the larger influence on D1.

For each predicted data set provided to the fusion processor 32, Eq. 1 is calculated for all the observed landings that meet the temporal cutoff. The results are sorted, and the lowest D1 is the match. The lowest match distance represents the match distance that is closest to the predicted ball flight path. It would be apparent to those skilled in the art that the inverse of Eq. 1 could be used, and therefore the highest D1 value is the match. In either event, the spatial and temporal distances are used to determine what is closest to the predicted ball flight path. The fusion processor 32 provides the match to the simulator 18 that provided the initial predicted data set the observed ball flight data (step 300).

The fusion processor 32 may be more robust by using more predicted and observed flight parameters. For example, Eq. 2 may be used:

$$D_2 = D_1 + |s_p - s_0| \times K_s + |A_p - A_0| \times K_A \quad \text{Eq. 2}$$

where:
$K_s$ speed calibration constant
$K_a$ decent angle calibration constant

The constants in Eq. 1 and Eq. 2 may be adjusted to increase the accuracy of the system. These values may be adjusted based on heuristics and artificial intelligence. The system may look at prior system accuracy and automatically adjust the calibration constants in an attempt to further increase accuracy. These constants allow the system's engineer to specify where to mount the camera in mutual relationship between target and typical ball path. The position and orientation of the camera affects how ball flights are represented in pixel space. Therefore using those constants provides a means of normalizing the distance equation for all systems.

Equation 2 may be used when the original sorting of Eq. 1 (D1) yields more than one result that is within a margin of tolerance. By not performing this more robust calculation on all the possible observed landing under consideration, the system can more efficiently and quickly arrive at a match.

Figure 11:
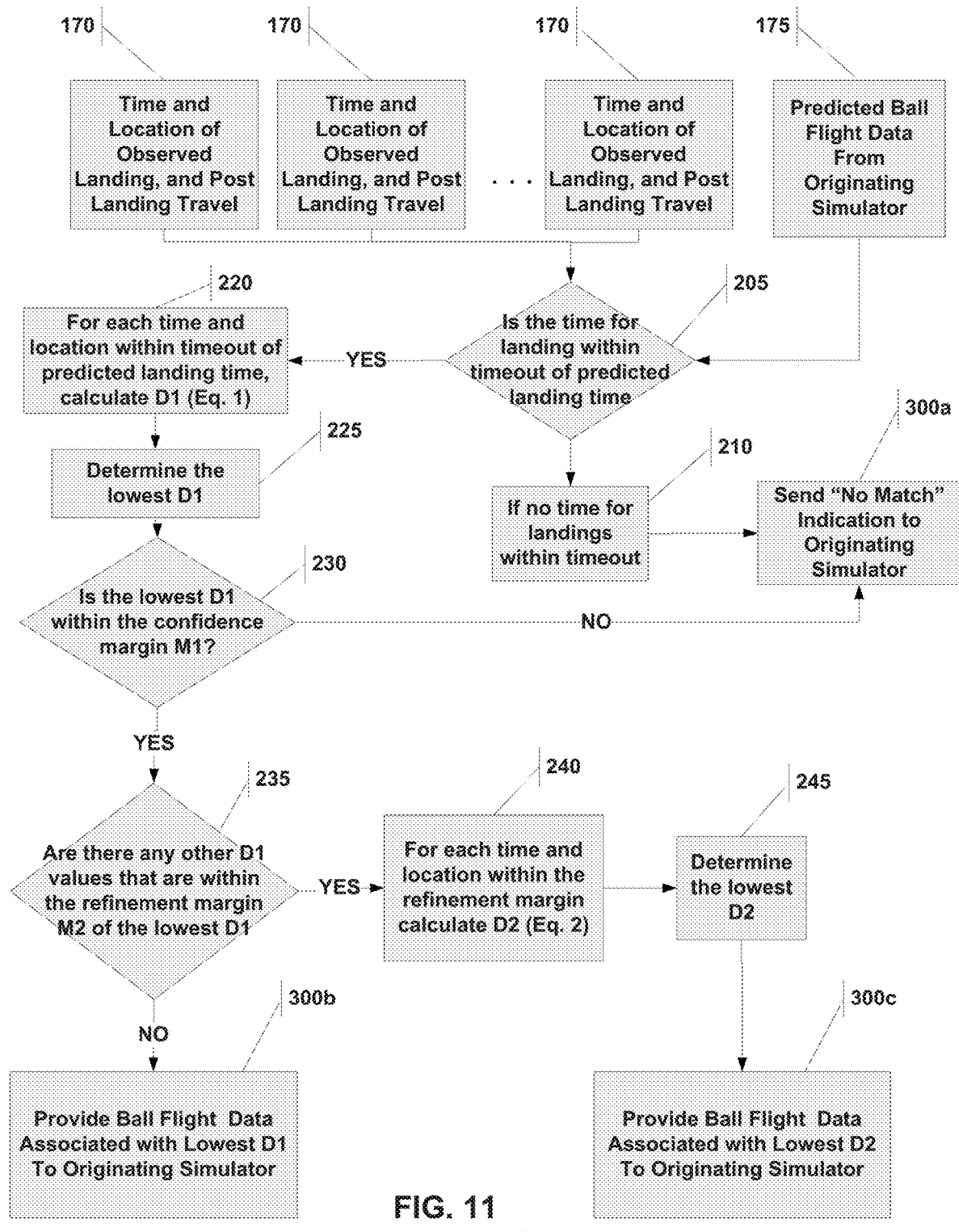
FIG. 11 is a flowchart used in the golf ball tracking system to match the observed and predicted ball data.

Shown in FIG. 11 is a flowchart showing the various steps that may be used to implement the method 200 for ranking and matching possible observed and predicted ball data pairs. The first part of the method is to receive the time and location of observed landings (step 170) and the predicted ball flight data from the simulator (step 175). At step 205, the various observed landing data sets are compared to the predicted ball landing time to make sure they are within the timeout value. If there are no such observed landing data sets, then the system sends a "No Match" indication to the simulator that originated the predicted ball flight data (steps 210, 300a). For those observed data sets that are within the timeout, a D1 value is calculated using Eq. 1 (step 220). The lowest D1 is determined and checked against a margin of confidence M1 (steps 225 and 230). This margin is intended to ensure that D1 is sufficiently small such that the system has confidence that there is a likely match. A second refinement margin M2 may be used to further confirm accurate matching. At step 235, all observed location data sets with D1 values within the refinement margin M2 of the lowest D1 value are checked using Eq. 2 (steps 235, 240). The lowest D2 value is therefore considered a match, and the associated observed location data set is provided to the simulator that originated the predicted ball path data (steps 245 and 300c). Returning to step 235, if there are no other D1 values within the refinement margin, the lowest D1 value is considered a match, and the associated observed location data set is provided to the simulator that originated the predicted ball path data (step 300b).

The margin of confidence M1 and the refinement margin M2 may be adjusted to increase the accuracy of the system. These values may be adjusted based on heuristics and artificial intelligence.

Figure 12:
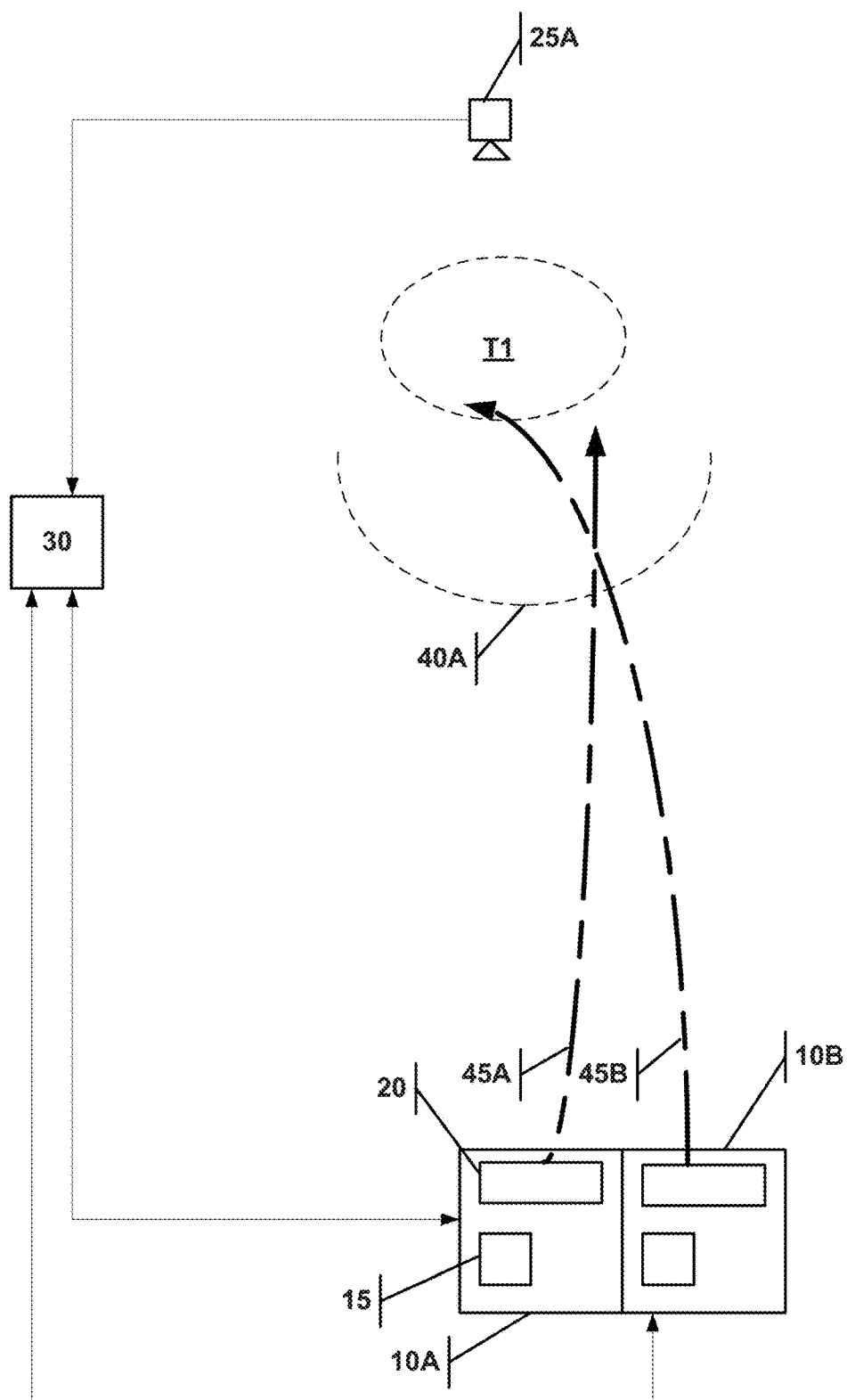
FIG. 12 is illustrates ball strikes from two adjacent driving bays.

FIG. 12 illustrates a simplified system limited to bays 10A, 10B. The down range camera/sensor 25A is positioned to detect the observed ball flight paths originating from a different ball strikes (45A and 45B) at a different location (bay 10A and bay 10B). The sensor 25A has been calibration pixel mapped—i.e., the sensor's FOV is correlated to three-dimensional space. A launch monitor 15 is positioned to detect one of the ball strikes (45A) and to measure the launch parameters of that ball strike. A central processor 30 is connected to the display 20, the sensor 25A and the launch monitor 15. The central processor performs the following steps: (a) receives the launch parameters from the launch monitor; (b) calculate a predicted ball flight path based on the launch parameters; (c) receive image data from the sensor; (d) identify an observed ball flight path and a landing event for each of the plurality of observed ball flights paths; (e) determine the landing location for each identified landing event; (f) based on the predicted ball flight path, determine a multi-dimensional matching distance for each of the plurality of landing locations; (g) selects the multi-dimensional matching distance that is closest to the predicted ball flight path; (h) morph the predicted ball flight path with the observed ball flight path and landing location associated with the closest distance; and (i) communicate to the display a video rendering based on the morphed ball flight path. The same is done for ball strike 45B. If the players are in competition, the central processor 30 may grant points to the player in bay 10B because his ball strike 45B landed in the target area T1.

Finally, it should be noted that the embodiments used herein reference a golf ball strike and tracking of that ball's trajectory. The same system and methods described herein may be used for other sports. For example, the launch monitor may be used in a baseball batting cage, and the sensors may be use to more precisely define and render the hit baseball trajectory. It should be apparent that the system and methods describe herein are not limited to golf.

The above description of the disclosed example embodiments is provided to enable any person skilled in the art to make or use the invention. Various modifications to these example embodiments will be readily apparent to those skilled in the art, and the generic principles described herein can be applied to other example embodiments without departing from the spirit or scope of the invention. Thus, it is to be understood that the description and drawings presented herein represent a presently preferred example embodiment of the invention and are therefore representative of the subject matter which is broadly contemplated by the present invention. It is further understood that the scope of the present invention fully encompasses other example embodiments that may become obvious to those skilled in the art and that the scope of the present invention is accordingly limited by nothing other than the appended claims.

The invention claimed is:

1. A ball tracking system comprising:
   a display;
   a sensor positioned to detect a plurality of observed ball flight paths, each in the plurality originating from a different ball strike at a different location; and
      wherein the sensor is correlated to three-dimensional space;
   a launch monitor positioned to detect one of the ball strikes and to measure the launch parameters of that ball strike;
   a processor connected to the display, sensor and launch monitor, wherein the processor is adapted to perform the following steps:
      a. receive the launch parameters from the launch monitor;
      b. calculate a predicted ball flight path based on the launch parameters;
      c. receive image data from the sensor;
      d. from the image data, identify an observed ball flight path and a landing event for each of the plurality of observed ball flights paths, further comprising the steps of;
         (1) capturing image frames;
         (2) performing ball detection within the image frames;
         (3) grouping detected balls based on spatial position and time that is characteristic of a ball in motion to form a bail trajectory; and
         (4) performing landing event identification based on a discontinuity in the ball trajectory in successive image frames;
      e. determine a landing location for each identified landing event;
      f. based on the predicted ball flight path determine a matching distance for each of the plurality of landing locations; and
      g. select the matching distance that is closest to the predicted ball flight path.

2. The ball tracking system of claim 1, wherein the processor is adapted to perform the following additional steps:
   h. morph the predicted ball flight path with the observed ball flight path and landing location associated with the closest distance to create a new flight path; and
   i. communicate to the display a video rendering based on the new flight path.

3. The ball tracking system of claim 2, wherein step (g) includes:
  g(1) compare the closest matching distance to a confidence margin;
  g(2) if the closest matching distance is within the confidence margin then continue to steps (h) and (i); and
  g(3) if the closest matching distance is not within the confidence margin then skip steps (h) and (i), and communicate to the display a video rendering based on predicted ball flight path.

4. The ball tracking system of claim 2, wherein:
  steps (a), (b), (h) and (i) are performed by a simulator;
  steps (c), (d) and (e) are performed by a target processor; and
  steps (f) and (g) are performed by a fusion processor.

5. The ball tracking system of claim 2, wherein:
  step (i) is delayed for a time period after the launch monitor detects the ball strike; and
  a beginning portion of the rendering is based on the predicted ball flight path, and an ending portion of the rendering is based on the observed ball flight path and landing location associated with the closest distance.

6. The ball tracking system of claim 5, wherein the beginning portion has a rendering perspective view, and the ending portion has a second rendering perspective view that is different from the first.

7. The ball tracking system of claim 6, further comprising a rendering transition from the first to the second rendering perspective views, and wherein the transition is discrete.

8. The ball tracking system of claim 6, further comprising a rendering transition from the first to the second rendering perspective views, and wherein the transition is not discrete.

9. The ball tracking system of claim 1, wherein:
  step (3) further includes determining the time of the landing event; and
  the matching distance in step (f) includes a temporal and a spatial measure of distance.

10. The ball tracking system of claim 9, wherein:
  step (e) further includes determining an observed descent angle and an observed impact speed prior to the landing event; and
  the matching distance in step (f) is based on the observed descent angle and an observed impact speed.

11. The ball tracking system of claim 1, wherein the predicted ball flight path of step (b) includes $t_p$ (time of landing) and $(x, y, z)_p$ (landing position), and wherein the landing location for each identified landing events of step (e) includes $t_0$ (time of landing) and $(x, y, z)_0$ (landing position), and wherein the matching distance is based on the following equation:

$$D_1 = \frac{|t_p - t_0|}{\text{timeout}} \times K_t + \sqrt{(x_p - x_0)^2 + (y_p - y_0)^2 + (z_p - z_0)^2} \times K_p$$

where timeout is a preset time, and $K_t$, $K_p$ are respectively the time and position calibration constants.

12. The ball tracking system of claim 11, wherein the calibration constants are automatically adjusted based on prior system accuracy.

13. The ball tracking system of claim 11, wherein the predicted ball flight path of step (b) includes $s_p$ (impact speed) and $A_p$ (descent angle), and wherein the landing location for each identified landing event of step (e) includes $s_0$ (impact speed) and $A_0$ (descent angle), and wherein the matching distance is further based on the following equation:

$$D_2 = D_1 + |s_p - s_0| \times K_s + |A_p - A_0| \times K_a$$

where $K_s$ and $K_a$ are speed and angle calibration constants, respectively.

14. The ball tracking system of claim 13, wherein D2 is performed on a subset of plurality of observed ball flight paths whose D1 values are within a refinement margin.

15. The ball tracking system of claim 14, wherein the refinement margin is based on the closest D1 value.

16. The ball tracking system of claim 13, wherein the calibration constants are automatically adjusted based on prior system accuracy.

17. The ball tracking system of claim 1, the system further comprising
  an atmospheric sensor connected to the processor that measures environmental data, wherein the predicted ball flight path is further based on the environmental data measured.

18. The ball tracking system of claim 1, further comprising a plurality of sensors and a plurality of launch monitors.

19. The ball tracking system of claim 18, wherein each launch monitor of the plurality of launch monitors is located in a separate driving bay.

20. The ball tracking system of claim 1, wherein the launch monitor comprises a side-positioned monitor and an overhead launch monitor.

21. The ball tracking system of claim 1, wherein the display comprises a portable device.

22. The ball tracking system of claim 1, wherein the processor is adapted to perform the following additional step of assigning a point value to the ball flight path associated with the closest distance, wherein the point value is based on the landing location associated with the closest distance.

23. A method for ball tracking for use with a display and with a sensor positioned to detect a plurality of observed ball flight paths, each in the plurality originating from a different ball strike at a different location, and wherein the sensor is correlated to three-dimensional space, a launch monitor is positioned to detect one of the ball strikes and to measure the launch parameters of that ball strike, the method comprising the steps of:
  a. receive the launch parameters from the launch monitor;
  b. calculate a predicted ball flight path based on the launch parameters;
  c. receive image data from the sensor;
  d. from the image data, identify an observed ball flight path and a landing event for each of the plurality of observed ball flights paths, comprising the steps of:
    (1) capturing image frames;
    (2) performing ball detection within the image frames;
    (3) grouping detected balls based on spatial position and time that is characteristic of a ball in motion to form a ball trajectory; and
    (4) performing landing event identification based on a discontinuity in the ball trajectory in successive image frames;
  e. determine a landing location for each identified landing event;
  f. based on the predicted ball flight path, determine a matching distance for each of the plurality of landing locations; and
  g. select the matching distance that is closest to the predicted ball flight path.

24. The method of claim 23, further comprising the steps of:
- h. morph the predicted ball flight path with the observed ball flight path and the landing location associated with the closest distance to create a new flight path; and
- i. communicate to the display a video rendering based on the new flight path.

25. The method of claim 23, further comprising the step of assigning a point value to the ball flight path associated with the closest distance, wherein the point value is based on the landing location associated with the closest distance.

26. A data processing apparatus, comprising a processor configured to perform the method of claim 23.

27. The data processing apparatus of claim 26, wherein the processor is further configured to perform the followings steps:

morph the predicted ball flight path with the observed ball flight path and the landing location associated with the closest distance to create a new flight path; and communicate to the display a video rendering based on the new flight path.

\* \* \* \* \*